(12) United States Patent
Knapp

(10) Patent No.: US 7,681,597 B2
(45) Date of Patent: Mar. 23, 2010

(54) THERMOSTATIC MIXER WITH DEVICE FOR DYNAMIC REGULATION OF A WATER FLOW

(75) Inventor: Alfons Knapp, Biberach an der RiB (DE)

(73) Assignee: Masco, Indianapolis, IN (US)

( * ) Notice: Subject to any disclaimer, the term of this patent is extended or adjusted under 35 U.S.C. 154(b) by 400 days.

(21) Appl. No.: 11/800,756

(22) Filed: May 7, 2007

(65) Prior Publication Data

US 2007/0289641 A1    Dec. 20, 2007

Related U.S. Application Data

(63) Continuation of application No. PCT/IB2005/003356, filed on Nov. 9, 2005.

(30) Foreign Application Priority Data

Nov. 9, 2004    (IT) .......................... TO2004A0774

(51) Int. Cl.
*F16L 55/04*    (2006.01)
(52) U.S. Cl. .............................. 138/31; 138/30; 138/26; 137/513.3; 137/601.2
(58) Field of Classification Search .................... 138/45, 138/46, 31, 30, 26; 137/513.3, 601.2, 469
See application file for complete search history.

(56) References Cited

U.S. PATENT DOCUMENTS 3,099,999 A * 8/1963 Vismara ................ 137/543.23
3,593,742 A * 7/1971 Taylor ........................ 137/504
3,603,344 A * 9/1971 Stampfli ................... 137/513.3
3,752,182 A * 8/1973 Brand ........................ 137/504
4,080,988 A * 3/1978 Robertson ................ 137/513.3
4,889,151 A * 12/1989 Oten ........................... 137/71
5,174,327 A * 12/1992 Truax et al. ................. 137/469
5,240,036 A    8/1993 Morris

FOREIGN PATENT DOCUMENTS

EP    1 214 634    7/2000
WO    WO01/04714    1/2001

OTHER PUBLICATIONS

International Search Report for PCT/IB2005/003356.

* cited by examiner

*Primary Examiner*—Patrick F Brinson
(74) *Attorney, Agent, or Firm*—Brinks Hofer Gilson & Lione

(57) ABSTRACT

The disclosure relates to a thermostatic mixer, including a device for the dynamic regulation of cold water flow which supplies the mixer. A resistance is generated to the flow of cold water supplied to the thermostatic mixer when small flows of mixed water are required, and said resistance is lifted or reduced when large flows of mixed water are required. Said operation is automatically carried out by devices for dynamic regulation of flow, whereby the flow cross-section provided for the incoming cold water is reduced when the drawn flow is reduced and a larger flow cross-section reestablished when a larger flow is required.

9 Claims, 2 Drawing Sheets

THERMOSTATIC MIXER WITH DEVICE FOR DYNAMIC REGULATION OF A WATER FLOW

CROSS-REFERENCE TO RELATED APPLICATIONS

This application is a continuation of International Application No. PCT/IB2005/003356 filed on Nov. 9, 2005, which claims the benefit of Italian Patent Application No. TO 2004 A 000774 filed Nov. 9, 2004. The disclosures of the above applications are incorporated herein by reference.

FIELD

The present disclosure relates to a device for dynamic water flow regulation as it is used to stabilize the function of a thermostatic mixer.

BACKGROUND

The statements in this section merely provide background information related to the present disclosure and may not constitute prior art.

Thermostatic mixers that are suited to handle a large flow rate regularly do not function if the flow rate required from them is considerably smaller than the maximum flow rate they are designed for, as occurs, for example, when a thermostatic mixer suited to supply a fixture comprising a plurality of showers is used to supply a single shower. Under these circumstances, the thermostatic mixers lose their stability and start to vibrate so that the water flow drawn from them is subject to constant fluctuations of the ratio between cold water and warm water and therefore sustains temperature between cold water and warm water and therefore sustains temperature fluctuations, which are uncomfortable for the user and may become dangerous. This disadvantage may be corrected by opposing a resistance to the cold water flow fed into the thermostatic mixer when small flow rates of mixed water are supposed to be pumped and by suppressing or reducing this resistance when large flow rates of mixed water are supposed to be pumped. This process is carried out automatically by devices for dynamic flow regulation, which are designed to reduce the passage cross-section provided to the arriving cold water when the accommodated flow rate is reduced and to restore a larger passage cross-section when an increased flow rate is required. Nevertheless, the known devices for dynamic flow regulation are generally associated with the disadvantage that they have a piston, which is exposed to the pressure of the arriving water in one direction and a recuperating spring in the opposite direction. Therefore, the load of the spring requires constant adjustment as a function of the inflow pressure of the cold water. Consequently, on the one hand during installation, the device must be adapted to the pressure conditions prevailing in the system to ensure correct function, and on the other hand the function of the device is no longer appropriate when considerable fluctuations of the cold water inflow pressure occur.

SUMMARY

The main object of the present invention is to create a device for dynamic flow regulation, the function of which must be independent from the inflow pressure to a great extent, so that the device does not require any adjustments during its installation and does not function irregularly even when considerable fluctuations of the inflow pressure occur.

Another object of the present invention is to create such a device for dynamic flow regulation, which has a simple design and is cost-efficient, and which also guarantees high reliability and a long service life.

These tasks are achieved according to the invention with a device for dynamic flow regulation, comprising in one body a feed chamber, a discharge chamber, a piston, which is disposed between the feed chamber and the discharge chamber and is exposed to the pressure of the feed chamber on one side and the pressure of the discharge chamber on the other side, wherein the piston is displaceable between a first position, which is offset toward the feed chamber, wherein in the first position the piston restricts the flow between the feed chamber and the discharge chamber, and a second position, which is offset toward the discharge chamber, wherein in the second position the piston does not restrict the flow between the feed chamber and the discharge chamber, and a recuperating spring acting on the piston toward the first position, characterized in that this piston is interspersed with a passage extending from the feed chamber toward the discharge chamber, that a flow limiting means is provided for limitation of the flow passing through the passage, and in that the recuperating spring is dimensioned such that its effect substantially corresponds to the force that tends to displace the piston from the first position into the second position when the maximum flow admitted by the flow limiting means is withdrawn.

In this way, as long as the flow rate passing through the device is not greater than the limit set by the flow limiting means, this flow limiting means opposes a reduced resistance to the required flow rate passing through the passage penetrating the piston; the pressure inside the discharge chamber remains below the pressure present inside the feed chamber, however it is close to it, and the force of the recuperating spring, which is advantageously dimensioned for low impact, retains the piston in its first position. However, when a flow rate above the limit set by the flow limiting means is required, this flow rate cannot flow through the passage penetrating the piston, and the pressure inside the discharge chamber is further reduced. Then the piston, which is exposed to the difference between the pressure present inside the feed chamber and the further reduced pressure present inside the discharge chamber, overcomes the low force of the recuperating spring and is displaced into its second position, whereby the passage of the flow from the feed chamber into the discharge chamber is released.

It is sufficient for the flow limiting means to be selected such that the resistance opposed by it to the water flow suffices to ensure proper functioning of the thermostatic mixing faucet at low flow rates, and for the recuperating spring to be selected such that it applies a weak force corresponding to the small pressure difference, which develops between the feed chamber and the discharge chamber when the maximum flow allowed by the flow limiting means is withdrawn, so that the flow sent into the thermostatic mixing faucet is slowed down as long as the withdrawn flow is low and is released when a higher flow rate is required, which ensures the stability of the thermostatic mixer.

Since what controls and/or regulates the displacement of the piston is not the absolute pressure present inside the chambers of the device, but the pressure difference between the feed chamber and the discharge chamber, which depends on the flow and the resistance opposed to it, but not on the absolute pressure, the function of the device is largely independent from the inflow pressure, and in turn, the device does not require any adaptation during its installation and does not exhibit any irregularities in its functioning, even when the inflow pressure varies considerably.

The flow limiting means used in the device according to the invention is a valve known from the state of the art, which is available commercially at low cost and which is explained, for example, in various types in the patent publications DE 40 41 116, DE 102 20 287, DE 102 28 490 and WO 01/04714. This valve provides a passage with reduced resistance to the flow, as long as the flow rate does not exceed a limit predefined by the design of the flow limiting means, while the valve counteracts the flow with greater resistance when the flow tends to exceed this limit, so that the flow rate is limited to the maximum allowed rate. Valves of this kind are often installed into fixtures such as showers, where in certain cases for statutory reasons consumption must be limited. Theses valves are available for many flow rate limits, therefore a suitable choice of the flow limiting means as well as appropriate proportioning of the recuperating spring suffice for creating a flow regulating device according to the invention, which is adapted to the necessities of various specific applications.

Preferably, the piston is displaceable with a first end in the feed chamber, while with its second end it is fixed to a cylinder that is attached to the body of the device, and it is connected to the discharge chamber and is oriented in relation to the feed chamber.

Preferably the flow limiting means is provided in the cylinder.

The recuperating spring may be provided in the cylinder and may act on the second end of the piston, or it may act between the base of the body of the device and a piston shoulder. In the latter case, the recuperating spring may be provided outside of the cylinder, in which the second end of the piston runs.

Preferably, the piston comprises a flange, which engages in a seat of the device body when the piston is in its first position and which disengages from it when the piston is in its second position. In this way, the flange releases the passage for the flow to a large extent when the piston is displaced to its second position and then experiences an entrainment effect by the flow, which tends to keep the piston in its second position. Thus, the position of the piston is stabilized. The position of this flange may be adjustable relative to the piston.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
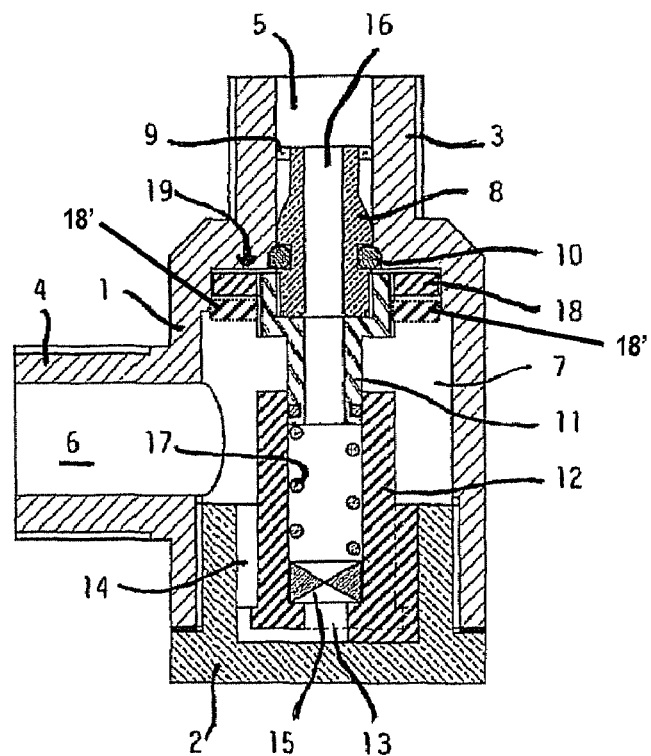
FIG. 1 shows an axial cross-sectional view of a device for dynamic flow regulation according to a first embodiment of the present invention in an idle state or withdrawal with reduced flow.
Figure 2:
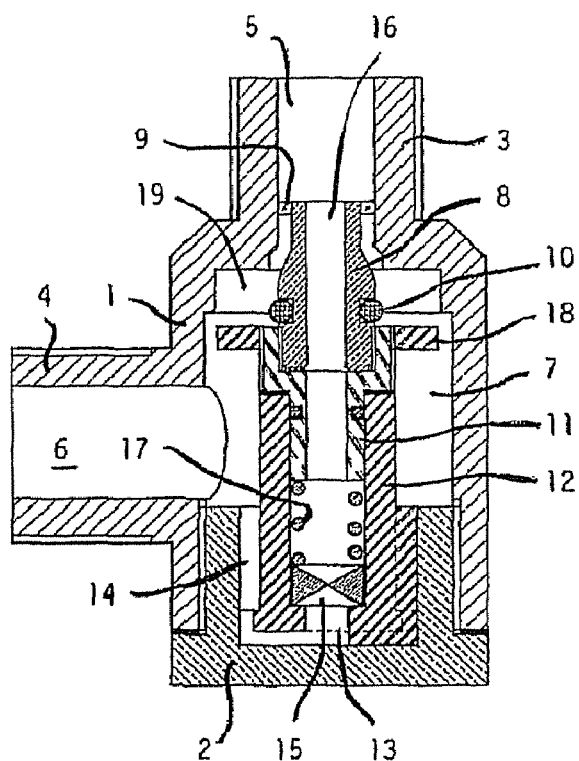
FIG. 2 shows the same device according to FIG. 1 in the state of withdrawal with increased flow.

In FIGS. 1 and 2, an axial cross-sectional view is shown of a device for dynamic water flow regulation as it is used for stabilizing the function of a thermostatic mixer, which comprises a body 1, which in this case is closed on the bottom by an end plate 2 and is provided with an inflow connector 3 as well as an outflow connector 4. On the inside, the inflow connector 3 forms a feed chamber 5 and the outflow connector 4 forms on its inside an outflow passage 6, which is connected to a discharge chamber 7 taking up the inside of the body 1.

Inside of the feed chamber 5, a first end of a piston 8 is mounted displaceably, which is guided by a collar 9 perforated by circumferential passages, allowing a flow passage around the piston 8. The collar 9 delimits the first end of the piston 8. In its idle state shown in FIG. 1 (first position or closing position), the piston 8 seals off the feed chamber 5 by means of an annular gasket 10 and opposes the passage of the flow from the feed chamber 5 to the discharge chamber 7.

On the side facing away from the collar 9, the piston 8 is extended by an element 11, forming the second end of the piston 8, which in this embodiment forms an element separately attached to the piston 8. The piston 8 and its second end 11 are interspersed by an axial passage 16. It is obvious that on one side the piston 8 is exposed to the pressure present in the feed chamber 5, which tends to push it out of this chamber, and on the other side to the pressure present inside the discharge chamber 7, which tends to push the piston toward the feed chamber 5.

In the body 1, and in this embodiment more precisely on the respective end plate 2, a fixed cylinder 12 is mounted, which is connected to the discharge chamber 7 via passages 13 and 14. The second end 11 of the piston 8 is displaceable in the cylinder 12 and guided therein. A flow limiting means 15 is mounted inside the cylinder 12.

A recuperating spring 17 is provided in the cylinder 12, which spring acts between a part fixed to the body 1, in this case the flow limiting means 15, and the second end 11 of the piston 8 such that the recuperating spring 17 exerts an elastic load on the piston itself, which pushes it toward the feed chamber 5 and additionally tends to hold it in its first closing position illustrated in FIG. 1 or to move it there. This recuperating spring is dimensioned in such a way that its effect substantially corresponds to the relatively weak force which tends to displace the piston from the first position into the second position when the maximum flow rate allowed by the flow limiting means is withdrawn.

If under these circumstances a low flow rate is required by the outflow connector 4, which rate is not above the maximum flow rate allowed by the flow limiting means 15, a flow originating from the feed chamber 5 develops through the passage 16, the cylinder 12, the flow limiting means 15, passages 13 and 14 to the discharge chamber 7 and therefore to the discharge passage 6. Since the flow limiting means 15 provides reduced resistance to the flow as long as a flow that does not exceed the flow rate limit passes through the device, the pressure developing in the discharge chamber 7 ranges close to the pressure present in the feed chamber 5. Therefore a small pressure difference acts on the piston 8, which is over-compensated by the recuperating spring 17 dimensioned in the way described above, in order for the piston 8 to stay in its first closing position illustrated in FIG. 1, even if the device is in a withdrawal state with a low flow rate.

However, when the outflow connector 4 requires a flow rate greater than the one that the flow limiting means 15 allows to pass, the pressure inside the discharge chamber 7 is considerably reduced and the pressure difference acting on the piston 8 exceeds the force of the retainer spring 17. Then, the piston 8 is displaced into the second opening position shown in FIG. 2. The gasket 10 ceases to form a seal to the feed chamber 5, and the passage of the flow from the feed chamber 5 to the discharge chamber 7 is basically free.

When thereafter the required flow rate is reduced again or completely turned off, the effect of the recuperating spring 17 once more exceeds the pressure difference acting on the piston 8 and the piston is displaced back into its first closing position according to FIG. 1.

Preferably, a flange 18 is connected to the element 11 that forms the second end of the piston 8, which flange in the first position of the piston 8 shown in FIG. 1 engages in a seat 19 provided in the body 1, while the flange 18 disengages from the seat 19 in the second position of the piston 8 shown in FIG. 2. When the flange 18 is in this second position, it leaves a lot of room for the flow and experiences an entrainment effect from the flow, which opposes the effect of the recuperating spring 17. The effect of the flange 18 in turn tends to stabilize the second position of the piston 8.

It may be indicated that the flange 18, as it is implemented for the above-described embodiment, is screwed onto the element 11, so that its axial position with respect to the piston 8 can be adjusted, as indicated by reference numeral 18 ' in FIG. 1. In this way, the level of stability of the device can be adjusted.

Figure 3:
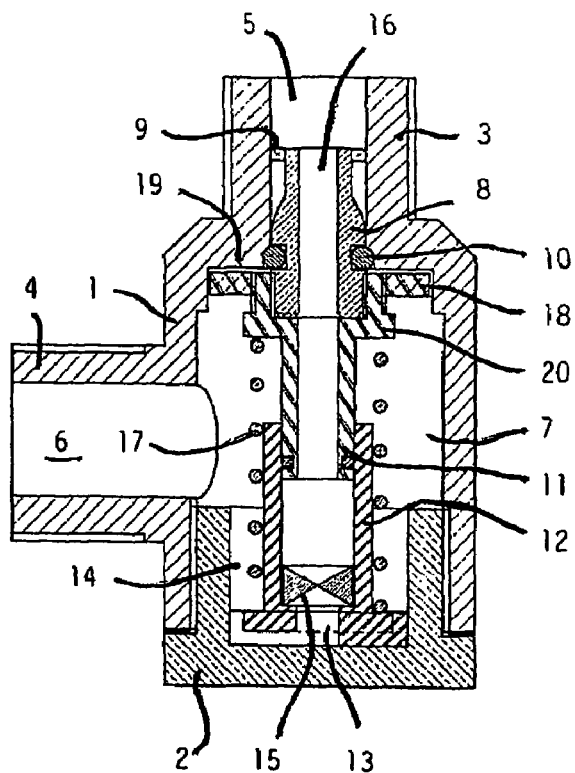
FIG. 3 shows equivalent to FIG. 1 a second embodiment of the device according to the invention.
Figure 4:
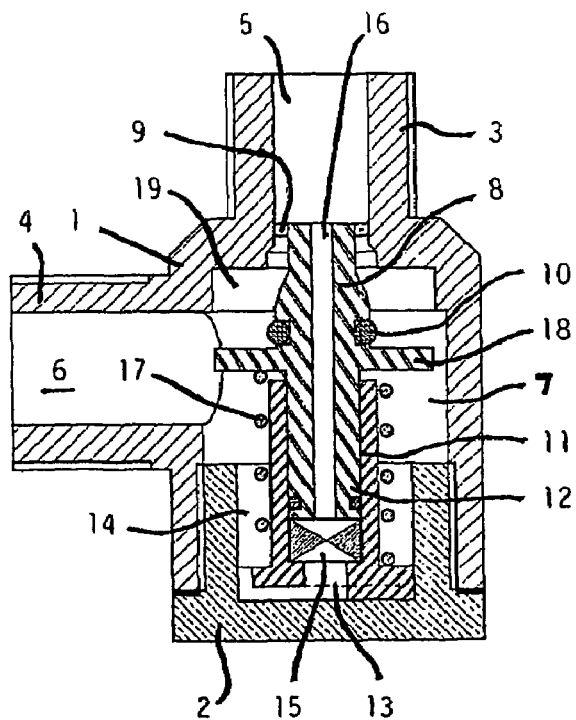
FIG. 4 shows equivalent to FIG. 2 a third embodiment of the device according to the invention.

FIGS. 3 and 4 show two additional embodiments of the device according to the invention. In these, parts identical to the parts of the first embodiment or corresponding to them have been denoted with the same reference numerals.

The embodiment according to FIG. 3 only differs from the previously described embodiment in that the recuperating spring 17 is disposed around the cylinder 12 instead of being inserted into the cylinder 12 and acting against the second end 11 of the piston 8, and that it acts on the end plate 2 of the body 1 and one shoulder 20 of the piston.

In the embodiment according to FIG. 4, the recuperating spring 17 is again disposed around the cylinder 12, however in this case it acts on the end plate 2 of the body 1 and the flange 18 of the cylinder 8. Furthermore, FIG. 4 shows a simplification of the design of the cylinder 8, according to which the element 11 that forms the second end and the flange 18 may be configured as one single piece.

As is apparent from the above description, the invention enables the implementation of a device for dynamic water flow regulation, which device is practically not sensitive to fluctuations in the cold water inflow pressure, the flow of which it regulates in order to send it into a thermostatic mixer to stabilize the function of the same. As a result, it is no longer required to adjust the load of the recuperating spring as a function of the inflow pressure present inside the fixture, and furthermore no defect whatsoever can be observed in the functioning of the device, even if, for whatever reason, this inflow pressure varies to a greater extent. The device may be implemented in such way that it meets various requirements of installation by simply choosing an adequate flow limiting means and an appropriate dimension for the recuperating spring. Its design is relatively simple and economical.

It should be noted that the invention is not limited to the embodiments described and illustrated in the examples. A wide variety of modifications have been described, and more are part of the knowledge of a person skilled in the art. For instance, the flow limiting means could be mounted in the piston and the fixed cylinder could be omitted and replaced with another guiding device for the piston.

These and further modifications as well as any replacement with technical equivalents may be added to the description and figures without exceeding the scope of protection of the invention and of the present patent.

What is claimed is:

1. A device for dynamic flow regulation comprising in one body a feed chamber, a discharge chamber, a piston which is disposed between the feed chamber and the discharge chamber and which is exposed on one side to the pressure of the feed chamber and on the other side to the pressure of the discharge chamber, the piston being displaceable between a first position, which is offset toward the feed chamber, the piston narrowing the flow between the feed chamber and discharge chamber in the first position, and a second position, which is offset toward the discharge chamber, the piston not narrowing the flow between the feed chamber and the discharge chamber in the second position, and a recuperating spring that acts on the piston toward the first position, wherein the piston is penetrated by a passage extending from the feed chamber to the discharge chamber, that a flow limiting means provides a reduced resistance to the flow passing through the passage provided that the flow does not exceed a maximum flow, and that the recuperating spring is dimensioned such that its effect substantially corresponds to the force that tends to displace the piston from the first position into the second position when the maximum flow allowed by the flow limiting means is withdrawn.

2. The device for dynamic flow regulation according to claim 1, wherein the piston is disposed displaceably with its first end inside the feed chamber and with its second end inside a cylinder attached to the device body, which cylinder is connected to the discharge chamber and is oriented in relation to the feed chamber.

3. The device for dynamic flow regulation according to claim 2, wherein the flow limiting means is mounted inside the cylinder.

4. The device for dynamic flow regulation according to claim 2, wherein the recuperating spring is mounted on the inside of the cylinder and acts against the second end of the piston.

5. The device for dynamic flow regulation according to claim 2, wherein the recuperating spring is mounted outside of the fixed cylinder and acts between a part attached to the body of the device and a part connected to the piston.

6. The device for dynamic flow regulation according to claim 1, wherein the piston comprises a flange which engages in a seat of the body when the piston is in its first position and which disengages from it when the piston is in its second position.

7. The device for dynamic flow regulation according to claim 6, wherein the position of the flange may be adjusted relative to the piston.

8. The device for dynamic flow regulation according to claim 1, wherein the device is installed in series in the cold water inflow of a thermostatic mixer for stabilization of the same.

9. A device for dynamic flow regulation comprising in one body a feed chamber, a discharge chamber, a piston which is disposed between the feed chamber and the discharge chamber and which is exposed on one side to the pressure of the feed chamber and on the other side to the pressure of the discharge chamber, the piston being displaceable between a first position, which is offset toward the feed chamber, the piston narrowing the flow between the feed chamber and discharge chamber in the first position, and a second position, which is offset toward the discharge chamber, the piston not narrowing the flow between the feed chamber and the discharge chamber in the second position, and a recuperating spring that acts on the piston toward the first position, wherein the piston is penetrated by a passage extending from the feed chamber to the discharge chamber, that a flow limiting means is provided for limiting the flow passing through the passage, and that the recuperating spring is dimensioned such that its effect substantially corresponds to the force that tends to displace the piston from the first position into the second position when a maximum flow allowed by the flow limiting means is withdrawn, and the piston comprises a flange, which engages in a seat of the body when the piston is in its first position and which disengages from it when the piston is in its second position, wherein the position of the flange may be adjusted relative to the piston.

* * * * *